(12) United States Patent
Minematsu

(10) Patent No.: US 8,589,688 B2
(45) Date of Patent: Nov. 19, 2013

(54) MESSAGE AUTHENTICATION DEVICE, MESSAGE AUTHENTICATION METHOD, MESSAGE AUTHENTICATION PROGRAM AND STORAGE MEDIUM THEREFOR

(75) Inventor: Kazuhiko Minematsu, Tokyo (JP)

(73) Assignee: NEC Corporation, Tokyo (JP)

( * ) Notice: Subject to any disclaimer, the term of this patent is extended or adjusted under 35 U.S.C. 154(b) by 1315 days.

(21) Appl. No.: 12/083,872

(22) PCT Filed: Oct. 19, 2006

(86) PCT No.: PCT/JP2006/320826
§ 371 (c)(1),
(2), (4) Date: Apr. 21, 2008

(87) PCT Pub. No.: WO2007/052477
PCT Pub. Date: May 10, 2007

(65) Prior Publication Data
US 2009/0138710 A1    May 28, 2009

(30) Foreign Application Priority Data

Nov. 4, 2005   (JP) ................................ 2005-321234
Jan. 12, 2006  (JP) ................................ 2006-004812

(51) Int. Cl.
*G06F 11/00* (2006.01)
*H04L 29/06* (2006.01)

(52) U.S. Cl.
USPC ................. 713/170; 380/28; 380/37; 380/46; 713/180

(58) Field of Classification Search
USPC .......................................................... 380/1
See application file for complete search history.

(56) References Cited

U.S. PATENT DOCUMENTS

2001/0034839 A1  10/2001  Karjoth et al.
2003/0041242 A1*  2/2003  Patel .............................. 713/170
(Continued)

FOREIGN PATENT DOCUMENTS

EP   0781003 A2   6/1997
EP   1257084 A1   11/2002
(Continued)

OTHER PUBLICATIONS

Daemen et al., "A new MAC Construction Aired and a Specific Instance Alpha-MAC", Feb. 2005, pp. 1-18.*
(Continued)

*Primary Examiner* — Andrew Goldberg
(74) *Attorney, Agent, or Firm* — Foley & Lardner LLP

(57) ABSTRACT

A message authentication device, a message authentication method, a message authentication program and a storage medium therefor are provided, so as to realize higher speed processing than an authentication mode of existing block cipher, in combination of block cipher and one of its parts, with theoretical security in accordance with a high efficient preliminary process and with an efficient amount of available memory. The message authentication device includes: input means for inputting a message: padding means for padding the message, setting its length always to a constant of a block length, and outputting the message as a padded message; modified tree hash means for outputting hash values of one block by repeating a process of arranging hash functions with small input/output widths, corresponding to the padded message, generated based on parts of block cipher; adjustment value added encryption means for encrypting the hash values so as to set a tag; and output means for coupling and outputting the tag and the message.

12 Claims, 11 Drawing Sheets

(56) References Cited

U.S. PATENT DOCUMENTS

2004/0252836 A1   12/2004   Yoshida et al.
2007/0277043 A1*  11/2007   Sorensen .................... 713/180

FOREIGN PATENT DOCUMENTS

| | | |
|---|---|---|
| JP | 63-050223 | 3/1988 |
| JP | 3-266544 | 11/1991 |
| JP | 2001-519930 A | 10/2001 |
| JP | 2003-051821 A | 2/2003 |
| JP | 2003-333036 A | 11/2003 |
| JP | 2004-363739 A | 12/2004 |
| WO | WO 99/40702 | 8/1999 |
| WO | WO 2005/017809 A2 | 2/2005 |

OTHER PUBLICATIONS

M. Boesgaard et al., "Badger—A Fast and Provably Secure MAC," Applied Cryptography and Network Security (ACNS), 2005, pp. 1-16.

J. Daemen et al., "AES Proposal: Rijndael," AES Submission, 1998, pp. 1-23.

J. Daemen et al., A New MAC Construction ALRED and a Specific Instance Alpha-MAC, Fast Software Encryption, International Workshop, FSE 2005, Lecture Notes in Computer Science: vol. 3557 (Feb. 2005).

S. Halevi et al., "MMH: Software Message Authentication in the Gbit/second Rates," Fast Software Encryption, 4th International Workshop, FSE '97. Lecture Notes in Computer Science, vol. 1267, pp. 1-16.

T. Iwata et al., "OMAC: One-Key CBC MAC," Fast Software Encryption, International Workshop, FSE 2003, Lecture notes in computer science: vol. 2887, pp. 1-25.

S. Park, et al., "Improving the Upper Bound on the Maximum Differential and the Maximum Linear Hull Probability for SPN Structure and AES," International Workshop, FSE 2003, Lecture Notes in Computer Science: vol. 2887, pp. 1-14.

T. Iwata, "Research on the security in block cipher mode," Report on Information Technology Promotion Agency (IPA), cryptography research 2003, pp. 1-38.

S. Halevi et al., "MMH: Software Message Authentication in the Gbit/Second Rates," Fast Software Encryption, $4^{th}$ International Workshop, Jan. 1997, pp. 172-189.

* cited by examiner

F I G. 2
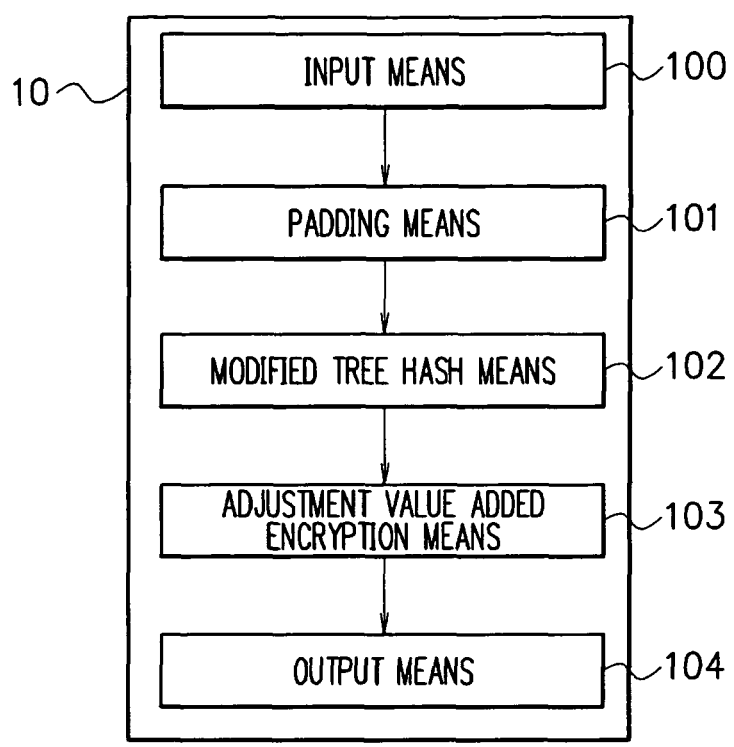

F I G. 6
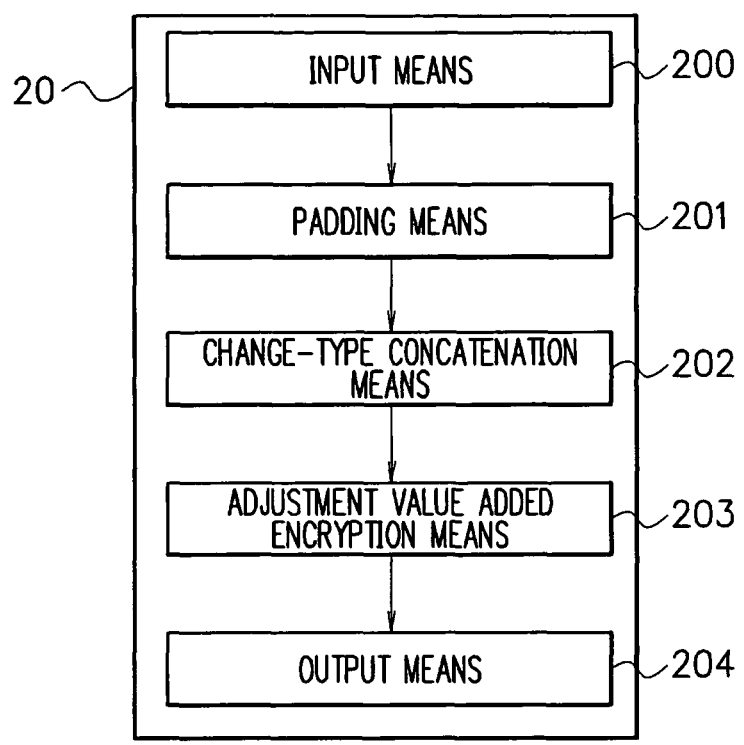

F I G. 9
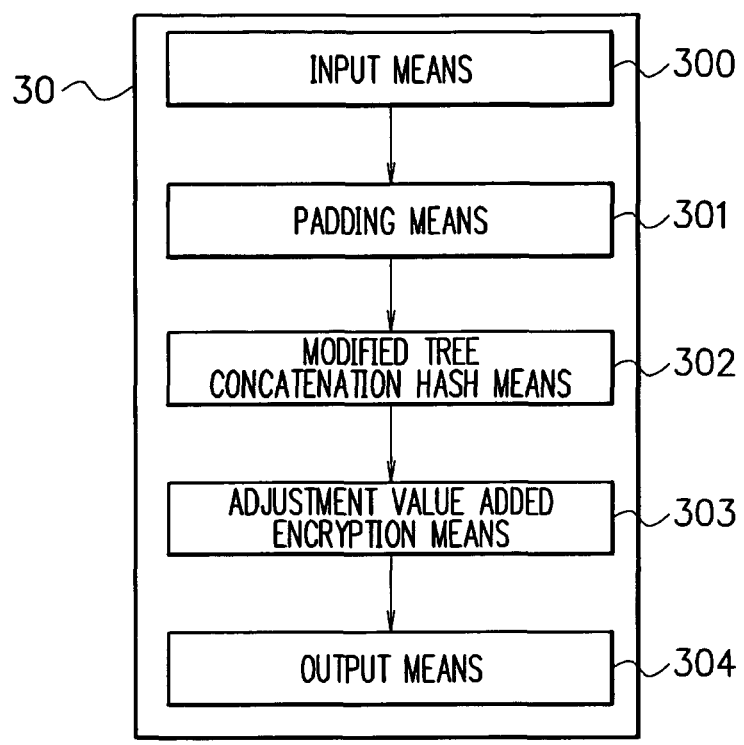

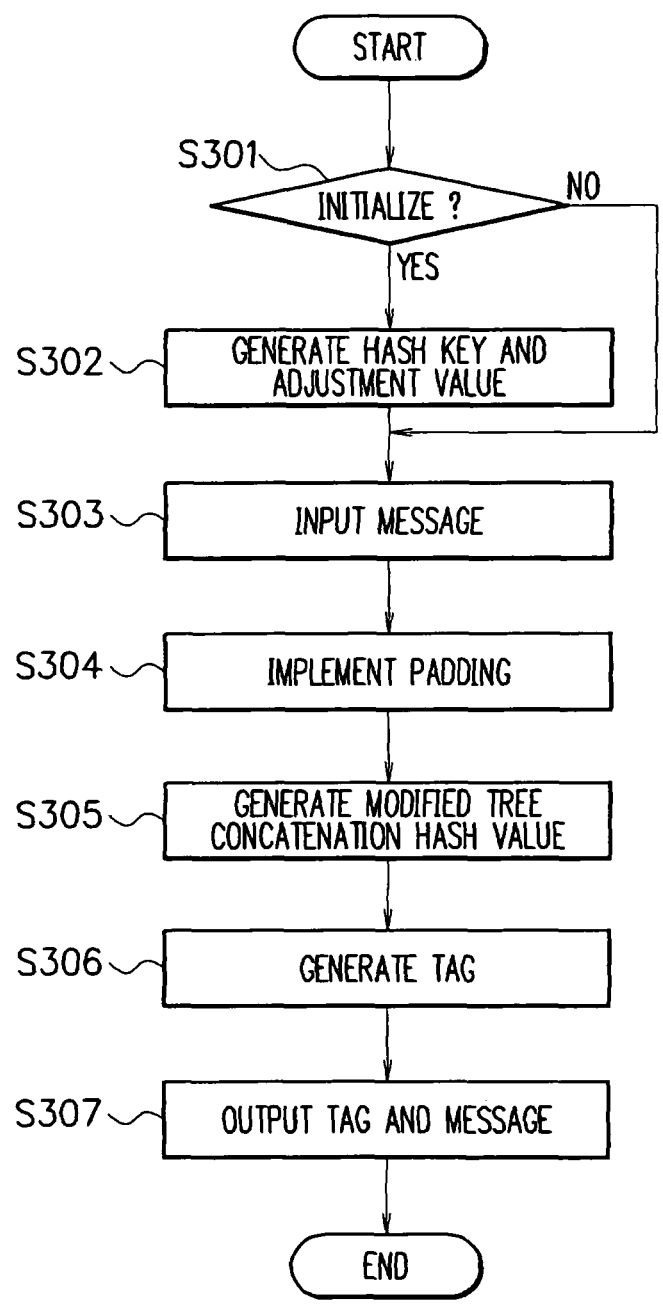

MESSAGE AUTHENTICATION DEVICE, MESSAGE AUTHENTICATION METHOD, MESSAGE AUTHENTICATION PROGRAM AND STORAGE MEDIUM THEREFOR

This application is the National Phase of PCT/JP2006/320826, filed Oct. 19, 2006, which claims priority to Japanese Application No. 2005-321234, filed Nov. 4, 2005, and Japanese Application No. 2006-004812, filed Jan. 12, 2006, the disclosures of which are hereby incorporated by reference in their entirety.

TECHNICAL FIELD OF THE INVENTION

The present invention relates to a general-purpose and high-speed message authentication device, message authentication method, message authentication program and storage medium therefor, that are configured in a combination of block cipher and a part of processes of the block cipher.

DESCRIPTION OF THE RELATED ART

Message authentication is a technique for giving a tag to be calculated by only those who know a secret key corresponding to a message and for ensuring authenticity of the message. For example, it is possible to detect whether a message has been tampered with by a third party during transmission between two transmission nodes sharing a secret key, using the message authentication.

Particularly, when a sender sends a message and a tag to a receiver, the receiver calculates a tag based on the received message, and determines whether the message has been sent from an authorized sender based on the agreement with the received tag. Note that, in the general message authentication technique, a unique authentication method on the receiver side is easily set upon set of a tag generating method. Thus, only the tag generating method simply needs to be specified.

Many message authentication methods employ block cipher. Such methods are called "message authentication mode using block cipher". Classically, examples of such methods are CBC-MAC mode, and CBC-MAC improved techniques, such as EMAC, XCBC and OMAC, etc. A problem is that, when a variable length block message is accepted, the security cannot be maintained in CBC-MAC. Another problem is that the processing is not settled, when the message length is not equal to a multiple of block length.

The processing amount of the improved modes, such as EMAC, XCBC, OMAC, etc., is approximately the same as that of CBC-MAC. The security can be maintained for an arbitrary length (bits) of messages. The above modes (including CBC-MAC) are disclosed, for example, in Non-patent document 1.

FIG. 1 shows a block diagram of OMAC as an example. As shown in FIG. 1, the above modes are very simple, but are required to operate block cipher for the number of blocks of a message when generating a corresponding tag. Thus, its speed never exceeds the speed of the block cipher.

According to another known method, message authentication is implemented in a combination with a keyed function(s) (called a universal hash function), in addition to the block cipher. This is also called a Carter-Wegman authentication technique, named after the introducers of the universal hash functions. It is reported that the universal hash functions that are optimized in accordance with the implementation can operate at a speed a few times faster than that of the presently well-applied block cipher. Since the universal hash functions are disclosed, for example, in Non-patent document 2.

According to some other known methods, the input width is arbitrarily increased (while the output width remain as is) using universal hash functions with small input/output widths. One of such methods is "modified tree hash" disclosed in Non-patent document 3. This modified tree hash will be described below with reference to the case when to use a universal hash function H of two block inputs and one block output. There are m blocks ($X=(X1, X2, \ldots, Xm)$) of inputs X, and Hi (where $i=1, 2, \ldots$) are instances of H with independent keys. If the modified tree hash with H is referred to as MTH, the hash can be expressed by following Equation (1):

$$MT_{H(X)} = G[H_s](G[H_{s-1}](\ldots, G[H_1](X), \ldots))\text{-} \qquad \text{Equation (1)}$$

When the input includes an even number of blocks:
$G[H_i](X) = H_i(X_1, X_2) | H_i(X_3, X_4) | \ldots | H_i(X_{m-1}, X_m)$
When the input includes an odd number of blocks:
$G[H_1](X) = H_i(X_1, X_2) | H_i(X_3, X_4) | \ldots | H_i(X_{m-2}, X_{m-1}) | X_m$
Note that "s" equals to the minimum integer that is equal to or greater than log(m) (base 2 logarithm).

$MT_H$ is to accept an arbitrary message with an integral multiple lengths of block length, and its output is always one block length.

As shown in Equation (1), the modified tree hash simply needs to prepare keys of no more than (log(m)+1) number of H in order to proceed m block plain text. Non-patent document 3 realizes the modified tree hash using MMH hash disclosed in Non-patent document 2.

According to Carter-Wegman authentication technique, the tag generation speed is generally faster than the authentication mode using only the block cipher (CBC-MAC, etc.), because the speed for generation tag is approximately the same as the speed for the universal hash functions. However, problems still remain therein, since the high-speed universal hash functions that can be implemented in any computation environment are not well known. The problems are that the universal hash functions cannot be used unless in the high-speed implement environment and the program size for implementing two parts is generally large.

One approach for solving such problems is to combine the block cipher and its part(s). Non-patent document 4 proposes a message authentication technique using such a combination. This technique realizes a tag generating process implemented at a higher speed than that of the block cipher, by repeating a round function of a part of the block cipher like the case of CBC-MAC.

However, this technique has a major problem that the theoretical security cannot be maintained, unlike the block cipher authentication mode disclosed in Non-patent document 1 and the technique for combining the universal hash functions and the block cipher. The theoretical security in this case indicates the property that the security of the authentication technique can be reduced always to the security of the block cipher itself. Non-patent document 1 gives a full detail of the definition. In the case of authentication technique without the theoretical security, one can forge the tag no matter how strong the applied block cipher is.

Patent document 1 discloses a message authentication technique for reducing the processing cost without compromising the security in XCBC. According to this technique, when a data length of digital data is a multiple of the block length, encryption is done by implementing an exclusive-or function using the last block and either one of a key K1 and a key K2. On the other hand, when a data length of digital data is not a multiple of the block length, "1" is added to the end part of the last block, and encryption is done for the data so as to fit into the block length by adding "0" thereto, by implementing an exclusive-or function using one of the key K2 and the key K1 which is the other one of the above one of the key K1 and the key K2.

Patent document 1: Japanese Patent Application Lid-Open Publication (JP-A) No. 2003-333036

Non-patent document 1: Tetsu Iwata, Research on the security in block cipher mode, Report on Information-technology Promotion Agency (IPA) cryptography research, 2003

Non-patent document 2: S. Halevi and H. Krawczyk, MMH:Software Message Authentication in the Gbit/second rates, Fast Software Encryption, 4th International Workshop, FSE '97, Lecture Notes in Computer Science; Vol. 1267, February 1997

Non-patent document 3: Martin Boesgaard, Ove Scavenius, Thomas Pedersen, Thomas Christensen, Erik Zenner, Badger-A Fast and Provably Secure MAC, Applied Cryptograhy and Network Security (ACNS) 2005

Non-patent document 4: J. Daemen and V. Rijmen, A New MAC Construction ALRED and a Specific Instance ALPHA-MAC, Fast Software Encryption, International Workshop, FSE 2005, Lecture Notes in Computer Science; Vol. 3557, February 2005

DISCLOSURE OF THE INVENTION

Problem to be Solved by the Invention

There is a problem that the speed faster than the speed of the block cipher itself cannot be achieved, because the block cipher is applied in each block of all input messages, in the presently known secure block authentication mode, such as CBC-MAC mode, etc.

There is another problem is that the Carter-Wegman authentication (whose speed is faster than the block cipher mode) is implemented only in a limited environment, for some reasons that the universal hash functions operating at a high speed in any environment are not well known and that the program size is increased due to implementation of both the block cipher and the universal hash functions.

The present invention has been made in consideration of the above, and an object thereof is to provide a message authentication device, message authentication method, message authentication program and storage medium therefor, so as to realize higher speed processing than an authentication mode of existing block cipher in combination of block cipher and one of its parts, with theoretical security in accordance with a high efficient preliminary process and with an efficient amount of available memory.

Means for Solving Problems

According to a first aspect of the present invention, a message authentication device comprises: input means for inputting a message; padding means for padding the message, setting its length always to a constant of a block length, and outputting the message as a padded message; modified tree hash means for outputting hash values of one block by repeating a process of arranging hash functions with small input/output widths, corresponding to the padded message, generated based on parts of block cipher; adjustment value added encryption means for encrypting the hash values so as to set a tag; and output means for coupling and outputting the tag and the message.

According to a second aspect of the present invention, a message authentication device comprises: input means for inputting a message; padding means for padding the message, setting its length always to a constant of a block length, and outputting the message as a padded message; change-type concatenation means for concatenating block cipher and a substitution process derived from a part of the block cipher, while adding the padded message on a block-by-block basis so as to compress the message into hash values of one block; adjustment value added encryption means for encrypting the hash values so as to set a tag; and output means for coupling and outputting the tag and the message.

According to a third aspect of the present invention, a message authentication device comprises: input means for inputting a message; padding means for padding the message, setting its length always to a constant of a block length, and outputting the message as a padded message; modified tree concatenation hash means for compressing the padded message by substituting a part of a process of the change-type concatenation means according to the second aspect with the modified tree hash means according to the first aspect, and outputting hash values of one block; adjustment value added encryption means for encrypting the hash values so as to set a tag; and output means for coupling and outputting the tag and the message.

According to a fourth aspect of the present invention, in the message authentication device according to the first aspect, the modified tree hash means includes four or more repetitions of an AES round function, while the adjustment value added encryption means includes AES.

According to a fifth aspect of the present invention, in the message authentication device according to the second aspect, the change-type concatenation means includes a combination of AES and four or more repetitions of an AES round function, while the adjustment value added encryption means includes AES.

According to a sixth aspect of the present invention, in the message authentication device according to the third aspect, the modified tree concatenation hash means includes a combination of AES and four or more repetitions of an AES round function, and the adjustment value added encryption means includes AES.

According to a seventh aspect of the present invention, in the message authentication device according to any one of the first aspect to third aspect, block cipher and a substitution process with a round function for the block cipher are used.

According to an eighth aspect of the present invention, a message authentication method comprises: a first step of inputting a message, in input means; a second step of padding the input message, setting its length always to a constant of a block length, and outputting the message as a padded message, in padding means; a third step of outputting hash values of one block by repeating a process of arranging hash functions with small input/output widths, corresponding to the output padded message, generated based on parts of block cipher in padding means; a fourth step of encrypting the output hash values so as to set a tag, in adjustment value added encryption means; and a fifth step of coupling and outputting the encrypted tag and the message, in output means.

According to a ninth aspect of the present invention, a message authentication method comprises: a first step of inputting a message, in input means; a second step of padding the input message, setting its length always to a constant of a block length, and outputting the message as a padded message, in padding means; a third step of concatenating block cipher and a substitution process derived from a part of the block cipher, while adding the padded message on a block-by-block basis, so as to compress the message to hash values of one block, in change-type concatenation means; a fourth step of encrypting the hash values so as to set a tag, in adjustment value added encryption means; and a fifth step of coupling and outputting the encrypted tag and the message, in output means.

According to a tenth aspect of the present invention, a message authentication method comprises: a first step of inputting a message, in input means; a second step of padding the input message, setting its length always to a constant of a block length, and outputting the message as a padded message, in padding means; a third step of compressing the output padded message by substituting a part of a process of the change-type concatenation means according to the second aspect with the modified tree hash means according to the first aspect, and outputting hash values of one block, in modified tree concatenation hash means; a fourth step of encrypting the hash values, in adjustment value added encryption means; and a fifth step of coupling and outputting the encrypted tag and the message, in output means.

According to an eleventh aspect of the present invention, in the message authentication method according to the eighth aspect, the modified tree hash means includes four or more repetitions of an AES round function, and the adjustment value added encryption means includes AES.

According to a twelfth aspect of the present invention, in the message authentication method according to the ninth aspect, the change-type concatenation means includes a combination of AES and four or more repetitions of an AES round function, and the adjustment value added encryption means includes AES.

According to a thirteenth aspect of the present invention, in the message authentication method according to the tenth aspect, the modified tree concatenation hash means includes a combination of AES and four and more repetition of an AES round function, and the adjustment value added encryption means includes AES.

According to a fourteenth aspect of the present invention, in the message authentication method according to any one of the eighth aspect to tenth aspect, block cipher and a substitution process using a round function for the block cipher are used.

According to a fifteenth aspect of the present invention, a message authentication program for controlling a computer is to execute the message authentication method according to any one of the eighth aspect to tenth aspect.

According to a sixteenth aspect of the present invention, a storage medium stores the message authentication program according to the fifteenth aspect.

Effect of the Invention

According to the present invention, there is provided a message authentication device, message authentication method, message authentication program and storage medium therefor, so as to realize higher speed processing than an authentication mode of existing block cipher in combination of block cipher and one of its parts, with theoretical security in accordance with a high efficient preliminary process and with an efficient amount of available memory.

Best Mode for Carrying Out the Invention

According to each of preferred embodiments of the present invention, a message authentication device includes: input means for inputting a message; padding means for padding the message, setting its length always to a constant of a block length, and outputting the message as a padded message; modified tree hash means for outputting hash values of one block by repeating a process of arranging hash functions with small input/output widths, corresponding to the padded message, generated based on parts of block cipher; adjustment value added encryption means for encrypting the hash values so as to set a tag; and output means for coupling and outputting the tag and the message.

Preferred embodiments of the present invention will now be described in detail based on the attached drawings. Since the described embodiments hereinbelow are preferred embodiments of the present invention, technically preferable various limitations are added thereto. However, the scope of the present invention is not limited to these embodiments unless otherwise limited within the description of the present invention.

First Exemplary Embodiment

A configuration and functions of each unit in a message authentication device of the first exemplary embodiment will now be described with reference to the attached drawings. FIG. 2 is a block diagram showing a configuration of the message authentication device of the exemplary embodiment. As shown in FIG. 2, a message authentication device 10 of the exemplary embodiment includes input means 100, padding means 101, modified tree hash means 102, adjustment value added encryption means 103 and output means 104. The message authentication device 10 of the exemplary embodiment can be realized using a CPU (processing unit), a memory (main memory unit) and a disc (auxiliary memory unit) and the like, which are included generally in a computer.

FIG. 3 is a block diagram showing a configuration of a general computer. As shown in FIG. 3, the general computer includes an input unit 1 such as a keyboard, mouse, etc., a processing unit (CPU) 2, a memory unit 3 and an output unit 4 such as a display, printer, etc. The processing unit (CPU) 2 includes a controller 5 and a calculator 6, and is a component part for mainly executing calculation processing and the like. The memory unit 3 includes a main memory unit 7 (main memory) and an auxiliary memory unit 8, and temporarily or permanently stores data.

Each of the means included in the message authentication device 10 of the exemplary embodiment shown in FIG. 2 can be realized by storing a program necessary for message authentication on the computer disc (the auxiliary memory unit 8 shown in FIG. 3) in advance and operating the program on the CPU (the processing unit 2 shown in FIG. 3). The input means 100 shown in FIG. 2 is to input target plain text (message) to which a tag is affixed. This is realized by a text input unit (the input unit 1 shown in FIG. 3), such as a keyboard, etc.

The padding means 101 is to convert a message length always to a multiple of a block. The block length is set in accordance with an input width of block cipher for use. If one block includes n bits and the remainder of the plain text length divided by n is (n-t), t bit data in which the first bit is "1" and the rest are all "0" is added to the plain text so that its length can be a multiple of the block. No processing is implemented for the plain text if its length has already been a multiple of the block.

Any padding method other than the above can be applied, as long as some conditions are satisfied. The conditions are that: different results are attained always by padding messages of different lengths that are not multiples of the block length; and no processing is implemented for a message whose message length is a multiple of the block length. The padding means 101 outputs the padded message and an indicator as "d", the indicator representing whether padding has been implemented by the padding means 101, that is, whether the original message length is a multiple of "n" (a multiple of "n" if d=1, and not multiple of "n" if d=2).

The modified tree hash means 102 is to compress the padded message output from the padding means 101 into one block, by repeating a process of arranging hash functions with small input/output widths, corresponding to the padded message, generated based on parts of block cipher. The one block includes n bits, and the n bit block cipher is "E". In addition, the determining substitution for the n bits is set as "f".

The process of the modified tree hash means 102 is realized by following Equation (2). This process is a keyed function of 2n bit inputs and n bit outputs. This key is one for the block cipher "E".

$$\text{For } X=(X_1,X_2), D_i(X)=X_2+f(E(i)+X_1) \quad \text{Equation (2)}$$

Note that "i" is a nonnegative integer equal or less than $2^{(n)}-1$, and the addition in Equation (2) represents an exclusive-or function.

Here, descriptions will be made to the maximum differential probability DP(f) of the n bit function "f" shown in Equation (2). The maximum differential probability DP(f) of the n bit function "f" indicates the minimum value of $Pr(f(X)-f(X+a)=b)$, where "a" is an n bit value except 0 and "b" is an arbitrary n bit value. Note, however, that the probability is obtained when X includes equally random n bit values. Both addition and subtraction represent the exclusive-or function.

It is necessary that, in the n bit function "f" shown in Equation (2), the above-described maximum differential probability DP(f) be sufficiently low, that is, sufficiently approximate to $2^{(-n)}$. In the case of n bit substitution, it is known that the maximum differential probability can logically be as low as $2^{(-n+1)}$. If "n" is a large value, however, it is not actually easy to form such a substitution function as to attain sufficiently low maximum differential probability.

However, it is possible to apply a keyed substitution instead of the determining substitution (i.e. to specify a substitution function with a random key from an aggregation of some substitution functions). At this time, the low average maximum differential probability $EDP(f_{K_p})$, as will be described later, is required.

The average maximum differential probability $EDP(f_{K_p})$ of the n bit keyed function $f_{K_p}$ (where $K_p$ represents a key) represents the minimum value of $Pr(f_{K_p}(X)-f_{K_p}(X+a)=b)$, where "a" is an n bit value except 0 and "b" is an arbitrary n bit value. Note, however, that the probability is obtained when "X" includes equally random n bit values and the key is a random value. Both addition and subtraction represent the exclusive-or function.

When to protect the block cipher from differential collision, it is necessary the above-described average maximum differential probability of the block cipher be low. Thus, in many cases, the keyed substitution with the low average maximum differential probability is a part of the block cipher. It is disclosed by, for example, S. Part, S. H. Sung, S. Lee, and J. Lim in Improving the Upper Bound on the Maximum Differential and the Maximum Linear Hull Probability for SPN Structure and AES, International Workshop, FSE 2003, Lecture Notes in Computer Science; Vol. 2887, February 2003, that a round function of four rounds is a keyed substitution with the low average maximum differential probability, in the case of a block cipher AES.

The modified tree hash means 102 can implement the modified tree hash of Non-patent document 3 using $D_i$ shown in Equation (2). That is, for m block inputs $X=(X_1, X_2, \ldots, X_m)$, the hash means obtains $MT_{D(X)}=G[D_s](G[D_s-1](\ldots, G[D_1](x), \ldots))$ (where "s" is the minimum integer equal to or greater than log(m) (base 2 logarithm)) in accordance with Equation (1), and outputs $MT_{D(X)}$ of one block. This $MT_{D(X)}$ is called a modified tree hash value.

E(1), E(2), ..., E(s) are used for obtaining $MT_{D(X)}$, and are called hash keys. In Equation (2), when a keyed substitution $f_{K_p}$ with $K_p$ as a key is used instead of f, the key $K_p$ provided for each of $D_1, D_2, \ldots$, may be the same or different independent value but is necessary to be randomly generated. The key $K_p$ may be a secret key of the message authentication device in combination with the key for the block cipher E, or when the hash keys are E(1), E(2) ..., E(s), the key $K_p$ may be formed of any necessary combination of E(s+1), E(s+1), ....

The hash keys E(1), E(2), . . . are necessary for $D_1$, $D_2, \ldots$, and may be generated in advance. Non-patent document 3 suggests adding length information to the modified tree hash value in order to avoid a hash-value collision between messages of different lengths. Due to a low collision probability of inputs of different lengths, there is no need to add the length information when realizing the modified tree hash means 102 using the modified tree hash disclosed in Non-patent document 3.

The modified tree hash may be modified. For example, following Equation (3) as a modification of Equation (1) may be used.

$$MT_{H(X)}=G[H_s](G[H_{s-1}](\ldots G[H_1](X)\ldots)) \quad \text{Equation (3)}$$

When the number of inputs is an even number of blocks:
$G[H_1](X)=H_i(X_1,X_2)|H_i(X_3,X_4)| \ldots |H_i(X_{m-1},X_m)$
When the number of inputs is an odd number of blocks:
$G[H_1](X)=H_i(X_1,X_2)|H_i(X_3, X_4)| \ldots |H_i(X_{m-2},X_{m-1})|H_i(X_m, 000\ldots 0)$, where "s" is the minimum integer equal to or greater than log(m)(base 2 logarithm) and 000 . . 0 are all sequences of 0.

This is the configuration of a basic tree hash disclosed in Non-patent document 3. When this tree hash is used, the length information of the original message is coupled to the end so as to be formed as an output, in order to prevent the hash value collision between messages of different lengths.

The adjustment value added encryption means 103 is to encrypt the modified tree hash value which is an output of the modified tree hash means 102. The encryption is implemented in accordance with following Equation (4).

$$TB[E](x,d)=E((L*u_d)+Y) \quad \text{Equation (4),}$$

where: n bit $u_1$ and $u_2$ are arbitrary different constant values except 1 and 0;
for arbitrary n bit values "a" and "b", the value a*b is the product for a finite field GF $(2^{(n)})$; and
for the block cipher "E", L=E (0) (where d=1 or 2).

The adjusted value added encryption means 103 outputs TB[E] (Y,d), where the output of the modified tree hash means 102 is "Y". In this case, "d" is an indicator indicating whether the output of the padding means 101 has been padded, that is, whether the message length is a multiple of "n". If "d" is 1, the message length is a multiple of "n". On the other hand, if "d" is 2, the message length is not a multiple of "n". L=E(0), or L*$u_1$ and L*$u_2$ may be calculated in advance and held in the memory.

Because the processing contents of encryption may change based on the indicator d, L*$u_1$ and L*$u_2$ are called adjustment values. The product * for the finite field can be calculated in accordance with very simple calculations such as the exclusive-or function of the bit shift and the conditional constant, since $u_1$ and $u_2$ are constant values. Such calculations (when $u_1=2$ and $u_2=4$) are disclosed, for example, by Tetsu Iwata, Kaoru Kurosawa in OMAC: One-Key CBC MAC, Fast Software Encryption, International Workshop, FSE 2003, Lecture Notes in Computer Science; Vol. 2887, February 2003.

The output means 104 sets encrypted data output from the adjustment value added encryption means 103 as a tag, and outputs the tag coupled with the message input to the input means 100 to a computer display or printer. FIG. 4 shows an operation example of the message authentication device 10, at the "m" block input. FIG. 4 exemplarily shows that the length of the message is just "m" block-length, and does not illustrate the input means 100, the padding means 101 and the output means 104. In FIG. 1, "E" identifies block cipher, and "f" identifies a determining substitution or keyed substitution. When the key is identified by "K" and the message is identified by "X", the encryption is identified by $E_{K(X)}$. In the case, the hash keys correspond to $E_{K(1)}, E_{K(2)}, \ldots, E_{K(d)}$.

Operations of the message authentication device 10 of the exemplary embodiment will now be described in detail with reference to FIG. 5.

FIG. 5 is a flowchart for explaining an operation of the message authentication device 10 of the exemplary embodiment. As shown in FIG. 5, the modified tree hash means 102 and the adjustment value added encryption means 103 check whether a hash key(s) and an adjustment value(s) for use have been generated in advance (Step 101).

If generated in advance, the flow advances to step 103. If not, a hash key(s) and an adjustment value(s) are generated (Step 102).

Then, a message is input (Step 103), and the padding is implemented (Step 104). The modified tree hash for the padded message is implemented (Step 105), and the adjustment value added encryption is applied for the output of the modified tree hash so as to set a tag (Step 106). Finally, the tag and message are coupled and output (Step 107).

Second Exemplary Embodiment

A configuration and functions of each part in a message authentication device of the second exemplary embodiment will now be described with reference to the attached drawings. FIG. 6 is a block diagram showing a configuration of the message authentication device of the exemplary embodiment. As shown in FIG. 6, a message authentication device 20 of the exemplary embodiment includes input means 200, padding means 201, change-type concatenation means 202, adjustment value added encryption means 203 and output means 204. The message authentication device 20 of the exemplary embodiment can be realized using a CPU (processing unit), a memory (main memory unit) and a disc (auxiliary memory unit), and the like, which are included generally in a computer.

FIG. 3 is a block diagram showing a configuration of a general computer. As shown in FIG. 3, the general computer includes the input unit 1 such as a keyboard, mouse, etc., the processing unit (CPU) 2, the memory unit 3 and the output unit 4 such as a display, printer, etc. The processing unit (CPU) 2 includes the controller 5 and the calculator 6, and is a component part for mainly executing calculation processing. The memory unit 3 includes the main memory unit 7 (main memory) and the auxiliary memory unit 8, and temporarily or permanently stores data.

Each of the means included in the message authentication device 20 of the exemplary embodiment shown in FIG. 6 can be realized by storing a program necessary for message authentication on the computer disc (the auxiliary memory unit 8 shown in FIG. 3) in advance and operating the program on the CPU (the processing unit 2 shown in FIG. 3). The input means 200 shown in FIG. 6 is to input target plain text (message) to which a tag is affixed. This is realized by a text input unit (the input unit 1 shown in FIG. 3), such as a keyboard, etc.

The padding means 201 is to generally convert a message always to a multiple of the block. The block length is set in accordance with an input width of block cipher for use. If one block includes n bits and the remainder of the plain text length divided by n is (n−t), t bit data in which the first bit is "1" and the rest are all "0" is added to the plain text so that the length can be a multiple of the block. No processing is implemented for the plain text if its length has already been a multiple of the block.

Any padding method other than the above can be applied, as long as some conditions are satisfied. The conditions are that: different results are attained always by padding messages of different lengths that are not a multiple of the block length; and no processing is implemented for a message whose message length is a multiple of the block length. The padding means 201 outputs the padded message and an indicator "d", the indicator representing whether padding has been implemented by the padding means 201, that is, whether the original message length is a multiple of n (a multiple of "n" if d=1, and not multiple of "n" if d=2).

The change-type concatenation means 202 concatenates the n bit block cipher "E" and an n bit substitution "f" derived from a part of "E", while adding the message on a block-by-block basis to compress the output from the padding means 201 into one block. The process of the change-type concatenation means 202 can be realized by equation (5) as will be described below. This process is a keyed function of n(t+3) bit inputs and n bit outputs, where "t" is set as a given nonnegative integer. The key includes a key for the block cipher "E" and auxiliary keys $KAux_1, KAux_2, \ldots, KAux_t$. In this case, "t" may be 0, that is, no auxiliary key may be prepared.

<Process ACBC>

$$ACBC(X) = (S_{t+1}) + X_{t+3} \qquad \text{Equation (5)}$$

For $X=(X_1, X_2, \ldots, X_{t+3})$, $S_i = f(E(X_1) + X_2)$

For $1 < i < t+2$, $S_i = f((S_{i-1}) + (KAux_{i-1}) + X_{i+1})$

The change-type concatenation means 202 concatenates the process ACBC of Equation (5). The means obtains ACBC (X) by applying ACBC to "X" in accordance with Equation (5), when the first (t+3) input block is set as "X". Further, the means couples ACBC(X) to the next (t+2) input block, and inputs it again to ACBC. The means repeats this process, immediately stops the process at the time when the last input block is added, and outputs this result. The means may or may not add auxiliary keys corresponding to the last input block.

The auxiliary key may be independent from the key for the block cipher, and may be generated in accordance with a later-described process using the adjustment value added encryption means 203. Like the modified tree hash means 102 in the first exemplary embodiment, it is necessary that "f" used in ACBC of Equation (5) be a substitution with a low maximum differential probability. Further, it is necessary that a low maximum self differential probability SDP(f) of the n bit function "f" described hereinafter be provided.

The maximum self differential probability SDP(f) of the n bit function f indicates the minimum value of $Pr(X-f(X)=a)$, when "a" is an arbitrary n bit value. Note that the probability is calculated when "X" includes equally random n bit values. Both addition and subtraction represent the exclusive-or function.

Like the modified tree hash means 102 in the first exemplary embodiment, it is possible to use a keyed substitution $f_{K_p}$ including K as a key instead of f in ACBC. In this case, $K_p$ may not be changed once it is set, or may be changed to independent random values of (t+1) (that is, the number of auxiliary key(s)+1) periodically at every processing for the message block. When the keyed substitution $f_{K_p}$ is used, it is necessary that both of the average maximum differential probability of $f_{K_p}$ and the later-described average maximum self differential probability $ESDP(f_{K_p})$ be low values.

The average maximum self differential probability ESDP ($f_{K_p}$) of the n bit keyed function $f_{K_p}$ ($K_p$ represents a key) indicates the minimum value of Pr ($X-f_{K_p}(X)=a$) where "a" is an arbitrary n bit value. Note that the probability is calculated, when "X" includes equally random n bit values and the key $K_p$ is a random value. Both addition and subtraction represent the exclusive-or function.

In the round function for block cipher, it is general that an exclusive-or function is processed for the key so as to attain an intermediate variable. In this configuration, it is easily shown that the average maximum self differential probability of the round function is the minimum. For example, in the AES round function, the average maximum self differential probability is the minimum value $2^{\wedge}(-128)$ regardless of the number of rounds. The output of the change-type concatenation means 202 is called "change-type concatenation hash value".

The adjustment value added encryption means 203 encrypts the change-type concatenation hash value in accordance with a process A as will be described below.

<Process A>

N bit $u_1$ and $u_2$ are arbitrary different constant values except 1 and 0. For arbitrary n bit values "a" and "b", the value a*b is the product for a finite field GF ($2^{\wedge}(n)$). For the block cipher "E", "L" is a random n bit value which is independent from the key for the block cipher. "L" is a key for the message authentication device in combination with the key for the block cipher. In this case, d is any one value of 0, 1 or 2. Further TTB[E,L] (Y, d) is set to: E(L+Y) if d=0; E((L*$u_1$)+Y) if d=1; and E((L*$u_2$)+Y) if d=2.

The adjustment value added encryption means 203 sets an indicator d indicating whether the output of the padding means 201 is the padded information, and encrypts the output of the change-type concatenation means 202 based on TTB [E,L]. If the output of the change-type concatenation means 202 is Y, the output of the adjustment value added encryption means 202 is: E((L*$u_1$)+Y) if d=1; and E((L*$u_2$)+Y) if d=2. L*$u_1$ and L*$u_2$ are referred to as adjustment values. Like the adjustment value added encryption means 103 in the first exemplary embodiment, when $u_1$ and $u_2$ are set to 2 and 4, the calculation is implemented as disclosed by Tetsu Iwata, Kaoru Kurosawa in OMAC: One-Key CBC MAC, Fast Software Encryption, International Workshop, FSE 2003, Lecture Notes in Computer Science; Vol. 2887, February 2003.

When "t" number of auxiliary keys are in the change-type concatenation means 202, E(L+0), E(L+1), . . . , E(L+t−1) may be auxiliary keys KAux$_1$, . . . , KAux$_t$. The selection processes may arbitrarily be exchanged therebetween in accordance with the values of d in the above process A. For example, when the indicator "d" indicates whether the padding has been performed and the output of the change-type concatenation means 202 is "Y", the output is E(L+Y) if d=1, the output is E(L*$u_1$+Y) if d=2. In addition, if there are "t" number of auxiliary keys, E((L*$u_2$)+0), E((L*$u_2$)+1), . . . , E((L*$u_2$)+t−1) may be set as the auxiliary keys.

The output means 204 is the same as the output means 104 of the message authentication device 10 of the first exemplary embodiment. FIG. 7 shows an operation example for a message with a given length in the message authentication device 20, as an example. In this example, the message length is just a multiple of the block length and the input means 200, the padding means 201 and the output means 204 are not illustrated. FIG. 7 also exemplarily shows that both the case where there is no auxiliary key and the case where one auxiliary key exists. In FIG. 7, "E" indicates the block cipher, and "f" indicates some determining substitution or keyed substitution.

Operations of the message authentication device 20 of the exemplary embodiment will now be described in detail with reference to FIG. 8. FIG. 8 is a flowchart for explaining the operation of the message authentication device 20 of the exemplary embodiment. As shown in FIG. 8, the change-type concatenation means 202 and the adjustment value added encryption means 203 check whether an auxiliary key(s) and an adjustment value(s) for use have been generated in advance (Step 201). If generated in advance, the flow advances to step 203. If not, an auxiliary key(s) and an adjustment value(s) are generated (Step 202).

Then, a message is input (Step 203), and the padding is implemented (Step 204). The change-type concatenation means 202 is implemented for the padded message (Step 205), and the adjustment value added encryption is applied for the output change-type concatenation hash value(s) of the change-type concatenation means 202 so as to set a tag (Step 206). Finally, the tag and message are coupled and output (Step 207).

Third Exemplary Embodiment

A configuration and functions of each part in a message authentication device of the third exemplary embodiment will now be described with reference to the attached drawings. FIG. 9 is a block diagram showing a configuration of the message authentication device of the exemplary embodiment. As shown in FIG. 9, a message authentication device 30 of the exemplary embodiment includes input means 300, padding means 301, modified tree concatenation hash means 302, adjustment value added encryption means 303 and output means 304. The message authentication device 30 of the exemplary embodiment can be realized using a CPU (processing unit), a memory (main memory unit) and a disc (auxiliary memory unit), etc. which are included generally in a computer.

FIG. 3 is a block diagram showing a configuration of a general computer. As shown in FIG. 3, the general computer includes the input unit 1 such as a keyboard, mouse, etc., the processing unit (CPU) 2, the memory unit 3 and the output unit 4 such as a display, printer, etc. The processing unit (CPU) 2 includes the controller 5 and the calculator 6, and is a component part for mainly executing calculation processing and the like. The memory unit 3 includes the main memory unit 7 (main memory) and the auxiliary memory unit 8, and temporarily or permanently stores data.

Each of the means included in the message authentication device 30 of the exemplary embodiment shown in FIG. 9 can be realized by storing a program necessary for message authentication on the computer disc (the auxiliary memory unit 8 shown in FIG. 3) in advance and operating the program on the CPU (the processing unit 2 shown in FIG. 3). The input means 300 and the padding means 301 shown in FIG. 9 are the same as those of the message authentication device 10 of the first exemplary embodiment. The adjustment value added encryption means 303 is the same as the adjustment value added encryption means 203 of the message authentication device 20 of the second exemplary embodiment.

The process of the modified tree concatenation hash means 302 is a process in which the process of the change-type concatenation means 102 of the first exemplary embodiment is partially replaced with the modified tree hash means 202 of the second exemplary embodiment. First, at least one integer "t" is set. "t" number of hash keys ($R_1, R_2, \ldots, R_t$) is used. In this case, for the output of the padding means 301, the first block is encrypted using the block cipher E so as to obtain $Y_0$. The means implements modified tree hash for the input of the next $2^{(t+1)}$ block, using $(R_1, R_2, \ldots, R_t, Y_0)$ as hash keys. Note that $Y_0$ is used for the process for compressing the last two blocks into one block.

This output of the modified tree hash is encrypted using the block cipher so as to obtain $Y_1$. The input of the next $2^{(t+1)}$ block is compressed using the modified tree hash with $(R_1, R_2, \ldots, R_t, Y_1)$ as hash keys. The hash means repeats this process. The last output of the modified tree hash is the output of the modified tree concatenation hash means 302. When the input into the last modified tree hash is shorter than $2^{(t+1)}$ block, its output is processed as follows. If the above process is repeated "s" times, the hash keys are set as $(R_1, R_2, \ldots, R_t, Y_s)$.

When only one block of "x" is the last input into the modified tree hash, $(Y_s)+x$ is the output. When two or more blocks are the inputs, YS is always used for the process for compressing the last two blocks into one block in the modified tree hash. That is, when two blocks $(z_1, z_2)$ are obtained by shortening the input using the modified tree hash through repetition of Equation (1), the output is $f(z_1+Y_s)+Z_2$.

When the modified tree hash is realized using a given determining substitution f, it is required that f has a low maximum differential probability and a low maximum self differential probability. When the modified tree hash is realized using a keyed substitution $f_{K_p}$ with the key "$K_p$", it is required that $f_{K_p}$ has a low average differential probability and a low average maximum self differential probability. "t" number of hash keys $(R_1, R_2, \ldots, R_t)$ may be provided independently from the key for the block cipher "E". Like the auxiliary keys in the second exemplary embodiment, $E(L+0)$, $E(L+1), \ldots, E(L+t-1)$ may be set as $R_1, \ldots, R_t$ respectively. The output of the modified tree concatenation hash means 302 is called as a modified tree concatenation hash value.

The adjustment value added encryption means 303 is the same as the adjustment value added encryption means 203 of the second exemplary embodiment. The output means 304 is the same as the output means 104 of the first exemplary embodiment. FIG. 10 shows an operation example for a message with a given length, in the message authentication device 30, as an example. In this example, the message length is just a multiple of the block length and the input means 300, the padding means 301 and the output means 304 are not illustrated. In FIG. 10, E, f, $g_{R1}, \ldots, g_{Rt}$ are the same as those shown in FIG. 4 and FIG. 7.

Operations of the message authentication device 30 of the exemplary embodiment will now be described in detail with reference to FIG. 11. FIG. 11 is a flowchart for explaining the operations of the message authentication device 30 of the exemplary embodiment. As shown in FIG. 11, the modified tree concatenation hash means 302 and the adjustment value added encryption means 303 check whether a hash key(s) and an adjustment value(s) for use are generated in advance (Step 301). If generated in advance, the flow advances to step 301. If not, a hash key(s) and an adjustment value(s) are generated (Step 302).

Then, a message is input (Step 303), and the padding is implemented (Step 304). The modified tree concatenation hash means 302 is implemented for the padded message (Step 305), and the adjustment value added encryption is applied for the output of the modified tree concatenation hash means 302 so as to set a tag (Step 306). Finally, the tag and message are coupled and output (Step 307).

According to the first effect of the present invention, it is possible to realize higher speed processing than the authentication mode of the block cipher, such as CBC-MAC. The reason for this is that some process such as the round function for block cipher, etc. is used for the message processing. In addition to the time taken for the preliminary process, only a small amount of processing is necessary for the above processing, as compared to the processing amount of the CBC-MAC, in an arbitrary message length. When the message is one block, the amount of processing is approximately the same as that of the CBC-MAC. This is, however, clearly the essential processing.

For example, When a block cipher AES and four repetitions of an AES round function (four round AES), disclosed by J. Daemen and V. Rijmen in AES Proposal: Rijndael, AES submission, 1998, disclose a block cipher AES, are used, the processing speed is approximately 1.3 times to 2.5 times faster than the AES CBC-MAC. The level of the high speed processing differs between the exemplary embodiments. Which exemplary embodiment is used depends on the capacity of available dynamic memory or the time of allowable preliminary process.

According to the second effect of the present invention, the program size is approximately the same as that in the authentication mode for the block cipher, such as CBC-MAC, etc. The reason for that is that only the block cipher and its part are used. Any other necessary calculation includes only a very simple function(s), such as an exclusive-or function, etc.

According to the third effect of the present invention, when applied for known block cipher, the present invention can be configured with the same theoretical security as that in the authentication mode for the block cipher, such as CBC-MAC, etc. The reason for this is that the present invention employs a secure authentication method in terms of the theoretical security shown in Non-patent document 1, when a part of block cipher used in the present invention has a theoretical security property over differential collision (i.e. the average maximum differential probability is sufficiently low).

It is noted that, since the necessity for block cipher with a sufficient security property is to attain such a low average maximum differential probability with some repetitions of round functions for block cipher, many recently proposed block cipher applications are so designed to have such a property. For example, for AES, a four round AES encryption has a sufficiently low average maximum differential probability, as disclosed by S. Park, S. H. Sung, L. Lee, and J. Lim in Improving the Upper Bound on the Maximum Differential and the Maximum Linear Hull Probability for SPN Structure and AES, International Workshop, FSE 2003, Lecture Notes in Computer Science; Vol. 2887, February 2003.

According to the preferred embodiments of the present invention, it is required that a part of the block cipher for use includes both the low average maximum differential probability and the low average maximum self differential probability. However, this is just an additional condition. In fact, it is shown that many block cipher applications (including AES) have a theoretically minimum average maximum self differential probability regardless of the repetition number of the round functions.

The present invention is applicable for preventing tampering in wireless or wired data communication or for preventing tampering with data on storage.

BRIEF DESCRIPTION OF THE DRAWINGS

FIG. 2 is a block diagram showing a configuration of a message authentication device according to a first exemplary embodiment.

FIG. 6 is a block diagram showing a configuration of a message authentication device according to a second exemplary embodiment.

FIG. 9 is a block diagram showing a configuration of a message authentication device according to a third exemplary embodiment.

FIG. 11 is a flowchart for explaining an operation of the message authentication device of the third exemplary embodiment.

DESCRIPTION OF THE NUMERALS

Figure 1:
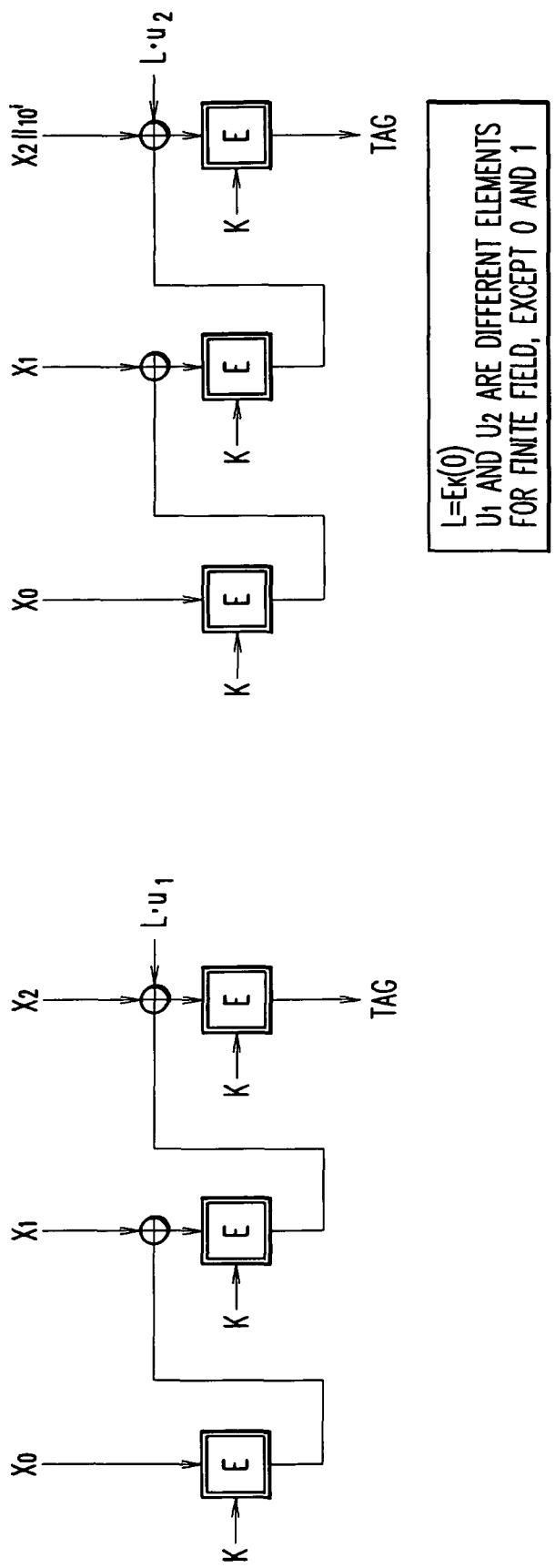
FIG. 1 is a block diagram showing OMAC.
Figure 3:
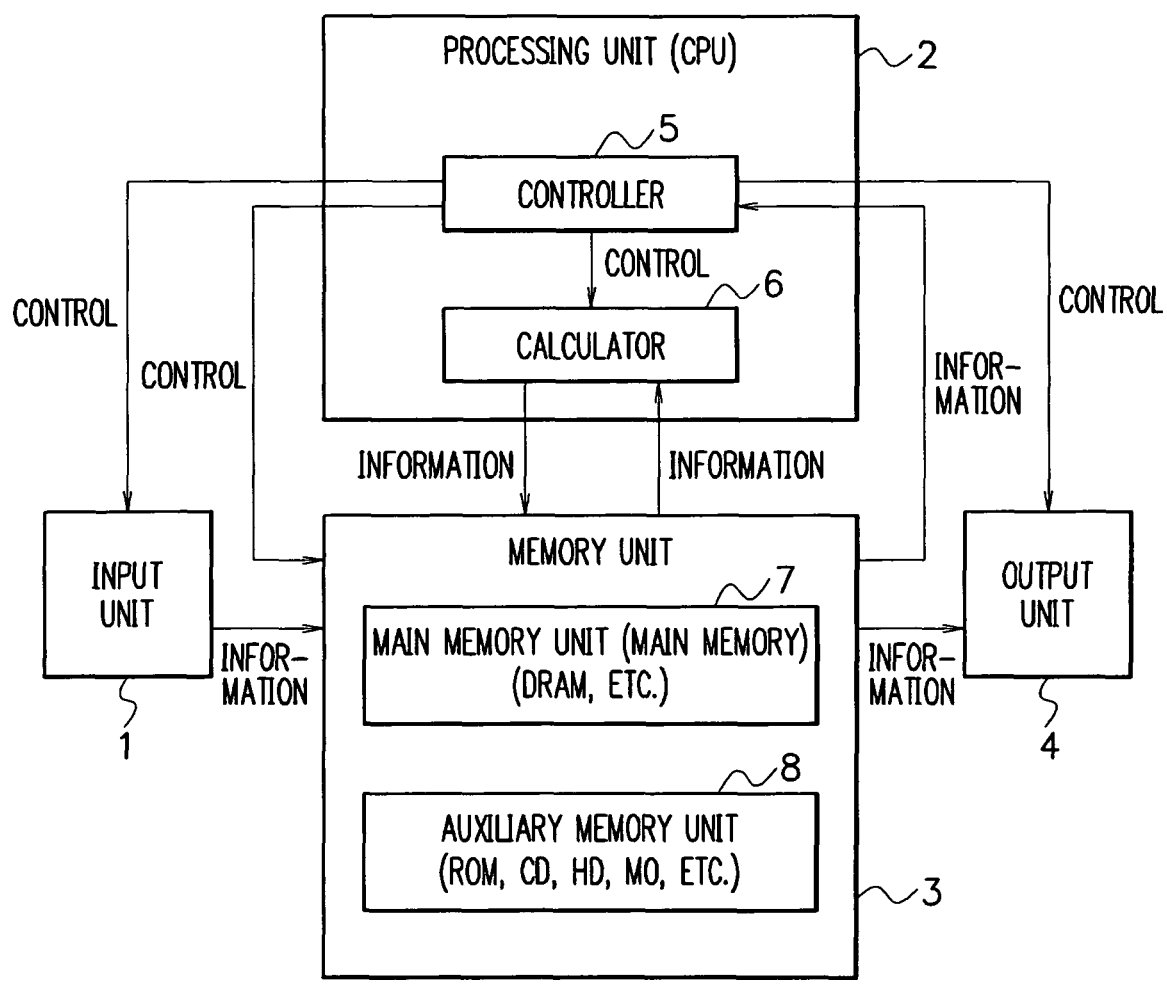
FIG. 3 is a block diagram showing a configuration of a general computer.
Figure 4:
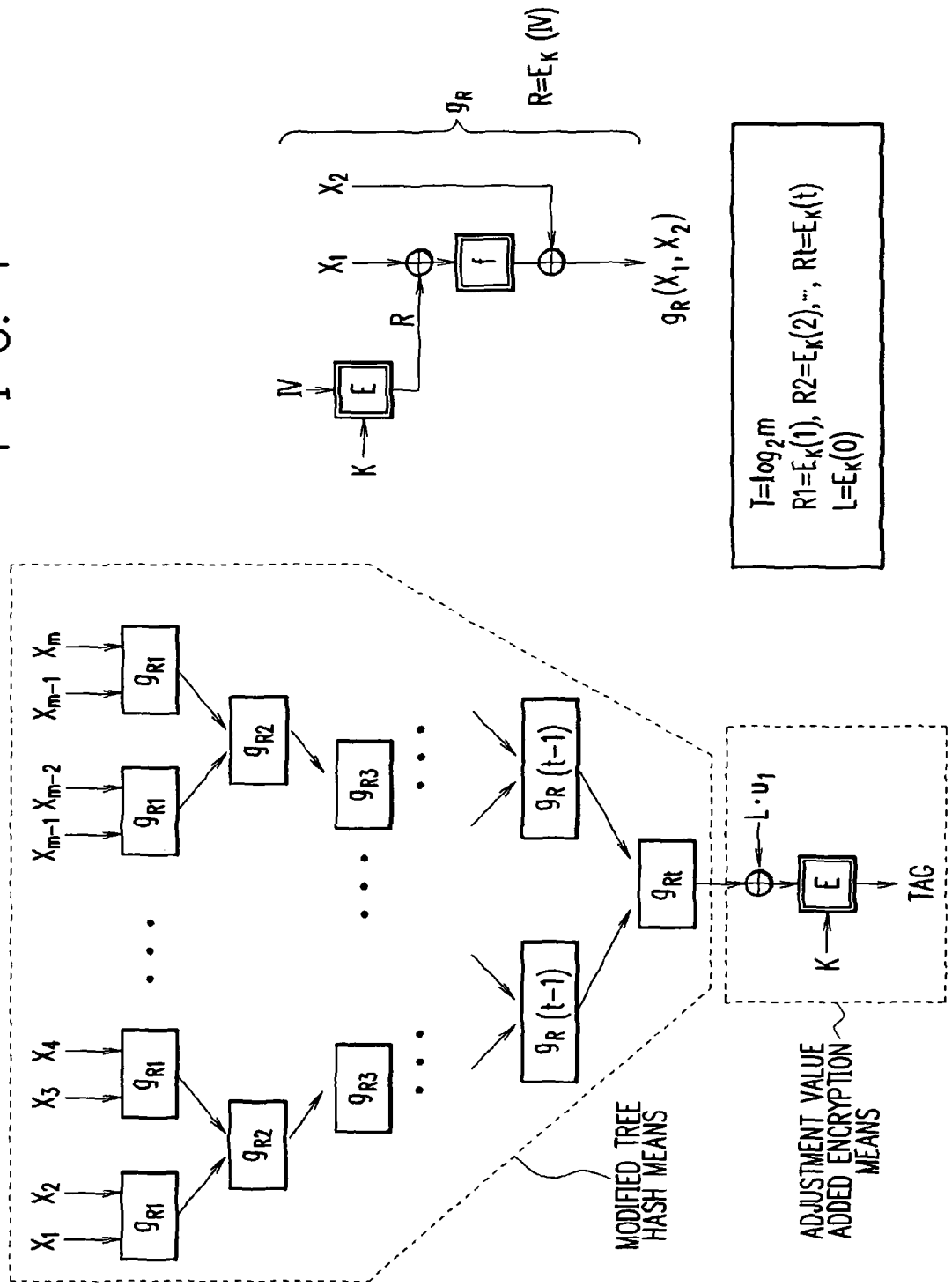
FIG. 4 is a diagram showing an operation example of m-block input in the message authentication device according to the first exemplary embodiment.
Figure 5:
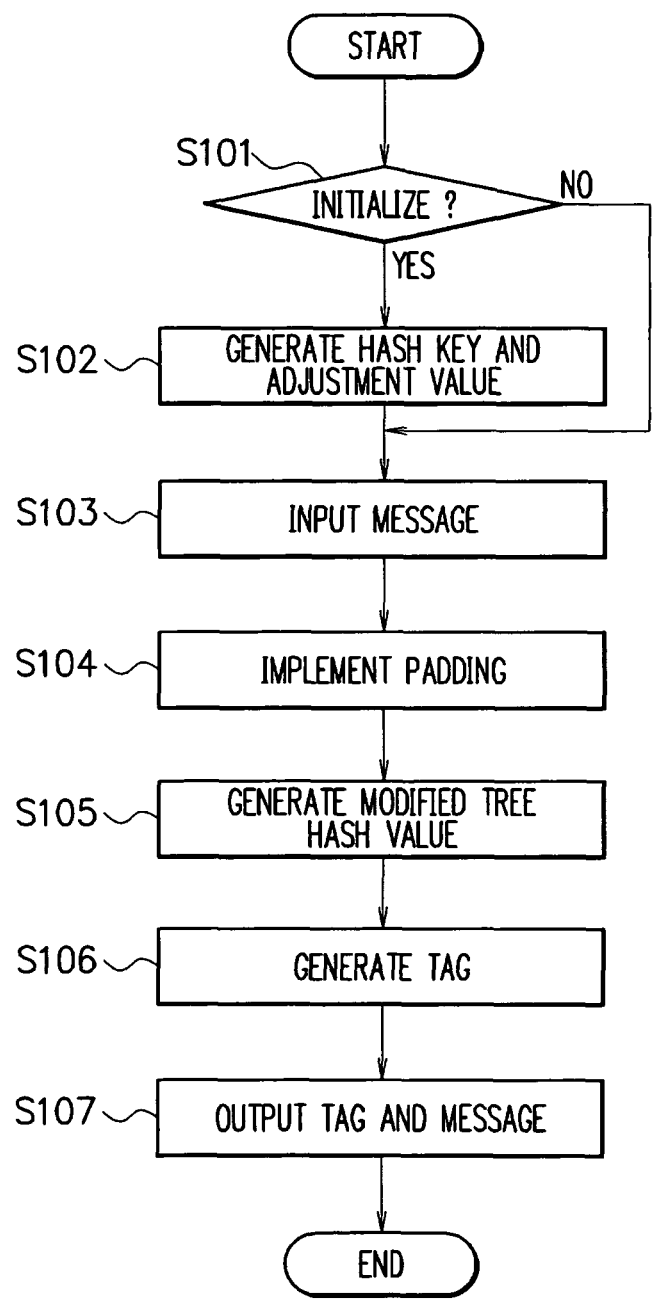
FIG. 5 is a flowchart for explaining an operation of the message authentication device of the first exemplary embodiment.
Figure 7:
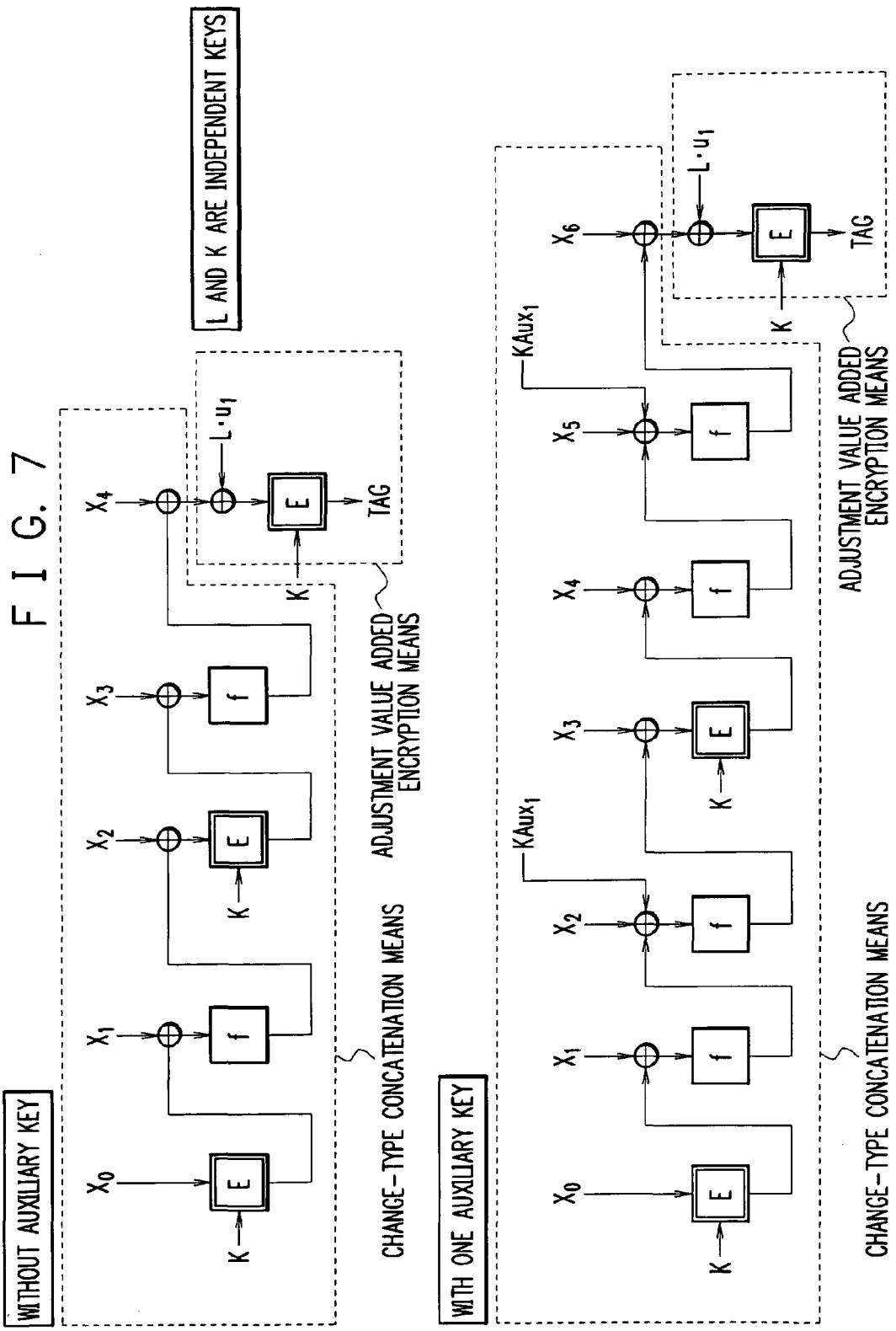
FIG. 7 is a diagram showing an operation example for a message with a given length in the message authentication device of the second exemplary embodiment.
Figure 8:
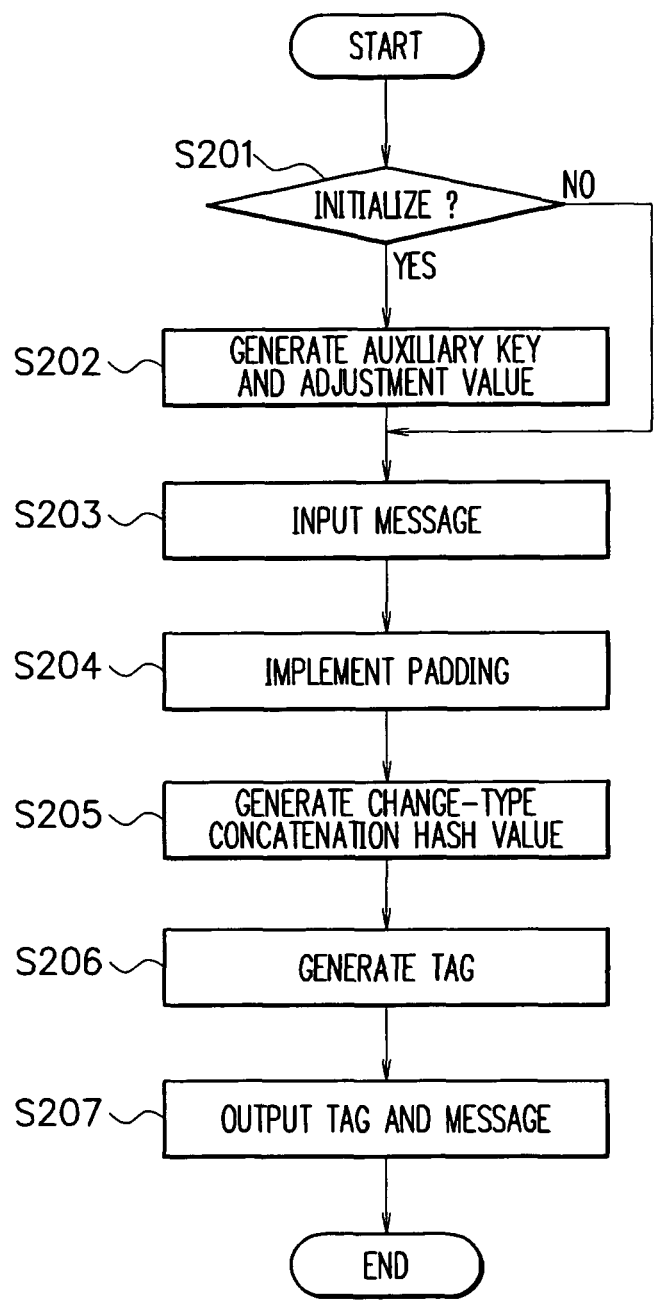
FIG. 8 is a flowchart for explaining an operation of the message authentication device of the second exemplary embodiment.
Figure 10:
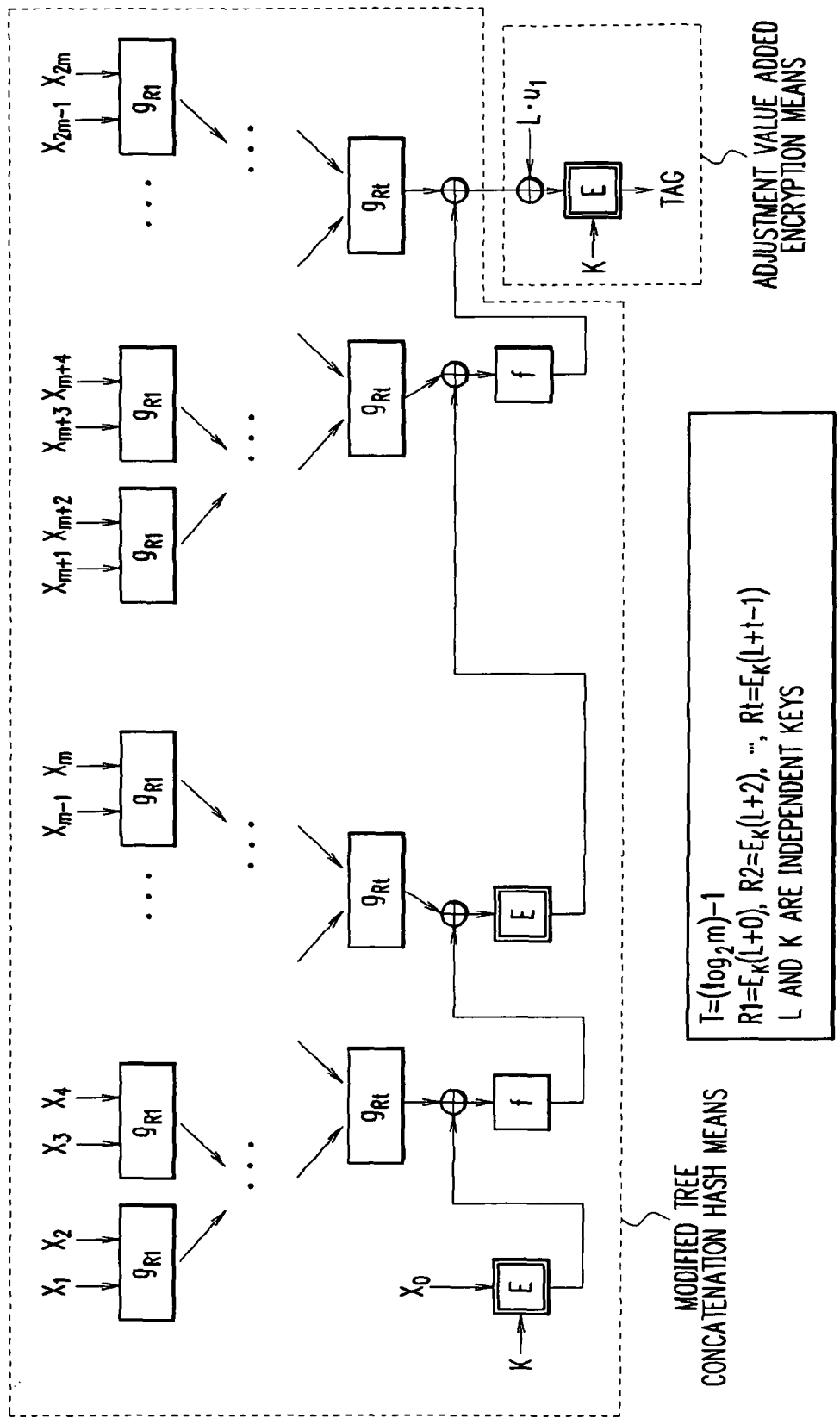
FIG. 10 is a diagram showing an operation example for a message with a given length in the message authentication device of the third exemplary embodiment.

1 INPUT UNIT
2 PROCESSING UNIT (CPU)
3 MEMORY UNIT
4 OUTPUT UNIT
5 CONTROLLER
6 CALCULATOR
7 MAIN MEMORY UNIT
8 AUXILIARY MEMORY UNIT
10, 20, 30 MESSAGE AUTHENTICATION DEVICE
100, 200, 300 INPUT MEANS
101, 201, 301 PADDING MEANS
102 MODIFIED TREE HASH MEANS
103, 203, 303 ADJUSTMENT VALUE ADDED ENCRYPTION MEANS
104, 204, 304 OUTPUT MEANS
202 CHANGE-TYPE CONCATENATION MEANS
302 MODIFIED TREE CONCATENATION HASH MEANS

The invention claimed is:

1. A message authentication device comprising:
an input unit which inputs a message;
a padding unit which pads the message, sets its length always to a multiple of a block length, and outputs the message as a padded message;
a binary tree hash unit which compresses the padded message, by dividing the padded message into a plural number of blocks in the block length, inputting each of the blocks to each of leaves of a binary tree then outputting a hash value of the block length in the root of the binary tree, wherein the binary tree includes repetitions of keyed hash functions, wherein each of the keyed hash functions obtains a first result which is a result of an exclusive-or function of a first block which is one of the blocks and a key which is the key of one of different keys in accordance with the depth of the binary tree based on a block cipher, obtains a second result which is a result of a substituted first result by a keyed or unkeyed one block substitution based on parts of the block cipher, and outputs the hash value which is a result of an exclusive—or function of the second result and a second block which is another block of the blocks;
an adjustment value added encryption unit which encrypts the hash values so as to set a tag; and
an output unit which couples and outputs the tag and the message.

2. The message authentication device according to claim 1, wherein
the binary tree hash unit includes four or more repetitions of an AES round function, while the adjustment value added encryption unit includes AES.

3. The message authentication device according to claim 1, wherein
block cipher and a substitution process with a round function for the block cipher are used.

4. A message authentication device comprising:
an input unit which inputs a message;
a padding unit which pads the message, sets its length always to a multiple of a block length, and outputs the message as a padded message;
a binary tree concatenation hash unit which compresses the padded message, by dividing the padded message into a plural number of blocks in the block length, inputting block sets to leaves of a binary tree in predetermined order for the block sets, the block sets comprised of a predetermined number of the blocks, then outputting the last of a hash value of the block length in the root of the binary tree by using the hash value of the previous binary tree in each of the binary trees, wherein the binary tree includes repetitions of keyed hash functions wherein each of the keyed hash functions obtains a first result which is a result of an exclusive-or function of a first block which is one of the blocks and a key which is the key of one of different keys in accordance with depth of the binary tree based on a block cipher, obtains, a second result which is a result of a substituted first result by a keyed or unkeyed one block substitution based on parts of the block cipher, and outputs the hash value which is a result of an exclusive-or function of the second result and a second block which is another block of the blocks;
an adjustment value added encryption unit which encrypts the hash values so as to set a tag; and
an output unit which couples and outputs the tag and the message.

5. The message authentication device according to claim 4, wherein
the binary tree concatenation hash unit includes a combination of AES and four or more repetitions of an AES round function, and the adjustment value added encryption unit includes AES.

6. A message authentication device comprising:
input means for inputting a message;
padding means for padding the message, setting its length always to a multiple of a block length, and outputting the message as a padded message;
binary tree hash means for compressing the padded message, by dividing the padded message into a plural number of blocks in the block length, inputting each of the blocks to each of leaves of a binary tree then outputting a hash value of the block length in the root of the binary tree, wherein the binary tree includes repetitions of keyed hash functions, wherein each of the keyed hash functions obtains a first result which is a result of an exclusive-or function of a first block which is one of the blocks and a key which is the key of one of different keys in accordance with depth of the binary tree based on a block cipher, obtains a second result which is a result of substituted first result by a keyed or unkeyed one block substitution based on parts of the block cipher, and outputs the hash value which is a result of an exclusive-or function of the second result and a second block which is another block of the blocks;

adjustment value added encryption means for encrypting the hash values so as to set a tag; and output means for coupling and outputting the tag and the message.

7. A message authentication method, implemented using a computer processor and memory, comprising:

a first step of inputting a message, in an input unit;

a second step of padding the input message, setting its length always to a multiple of a block length, and outputting the message as a padded message, in a padding unit;

a third step of compressing, via the computer processor and memory, the padded message, by dividing the padded message into a plural number of blocks in the block length, inputting each of the blocks to each of leaves of a binary tree, outputting a hash value by performing a processing that applies a block cipher process and a replacement process which is a component of the block cipher process in a predetermined order to each of the blocks, performing the processing after adding a result of the previous of the blocks, wherein the binary tree includes repetitions of keyed hash functions, wherein each of the keyed hash functions obtains a first result which is a result of an exclusive-or function of a first block which is one of the blocks and a key which is the key of one of different keys in accordance with depth of the binary tree based on a block cipher, obtains a second result which is a result of a substituted first result by a keyed or unkeyed one block substitution based on parts of the block cipher, and outputs the hash value which is a result of an exclusive-or function of the second result and a second block which is another block of the blocks;

a fourth step of encrypting, via the computer processor and memory, the output hash values so as to set a tag, in an adjustment value added encryption unit; and a fifth step of coupling and outputting the encrypted tag and the message in an output unit.

8. The message authentication method according to claim 7, wherein the binary tree hash unit includes four or more repetitions of an AES round function, and the adjustment value added encryption unit includes AES.

9. The message authentication method according to claim 7, wherein block cipher and a substitution process using a round function for the block cipher are used.

10. A non-transitory storage medium storing a message authentication program for controlling a computer to execute the message authentication method according to claim 7.

11. A message authentication method, implemented using a computer processor and memory, comprising:

a first step of inputting a message, in an input unit;

a second step of padding the input message, setting its length always to a multiple of a block length, and outputting the message as a padded message, in a padding unit;

a third step of compressing, via the computer processor and memory, the output padded message, by inputting block sets to leaves of a binary tree in predetermined order for the block sets, the block sets comprised of a predetermined number of blocks of the blocks, then outputting the last of hash value of the block length in the root of the binary tree by using the hash value of the previous binary tree in each of the binary trees, wherein the binary tree includes repetitions of keyed hash functions, wherein each of the keyed hash functions obtains a first result which is a result of an exclusive-or function of a first block which is one of the blocks and a key which is the key of one of different keys in accordance with depth of the binary tree based on a block cipher, obtains, a second result which is a result of a substituted first result by a keyed or unkeyed one block substitution based on parts of the block cipher, and outputs the hash value which is a result of an exclusive-or function of the second result and a second block which is another block of the blocks;

a fourth step of encrypting, via the computer processor and memory, the hash values, so as to set a tag, in an adjustment value added encryption unit; and a fifth step of coupling and outputting the encrypted tag and the message, in an output unit.

12. The message authentication method according to claim 11, wherein the binary tree concatenation hash unit includes a combination of AES and four and more repetition of an AES round function, and the adjustment value added encryption unit includes AES.

* * * * *

UNITED STATES PATENT AND TRADEMARK OFFICE
CERTIFICATE OF CORRECTION

PATENT NO. : 8,589,688 B2
APPLICATION NO. : 12/083872
DATED : November 19, 2013
INVENTOR(S) : Kazuhiko Minematsu It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1442 days.

Signed and Sealed this
Twenty-second Day of September, 2015

Michelle K. Lee
*Director of the United States Patent and Trademark Office*